2,713,029
Patented July 12, 1955

2,713,029

DRILLING MUD ADDITION AGENT

James M. Fuller, Laurel, Miss., assignor to Masonite Corporation, Laurel, Miss., a corporation of Delaware No Drawing. Application May 7, 1952,
Serial No. 286,630

3 Claims. (Cl. 252—8.5)

The present invention relates to drilling mud compositions and relates more particularly to oil well drilling muds characterized by improved viscosity and gel strength. More particularly, the invention relates to bentonitic drilling mud compositions containing a small proportion of an addition agent comprising a carbohydrate mixture derived from thermohydrolytically treated lignocellulose.

In drilling deep wells, and particularly in drilling oil wells where the depth to be attained may range from about 5,000 to 12,000 feet or more, the drilling operation frequently encounters serious problems due to the characteristics of the various strata through which the well extends, as well as to temperature and pressure variables and also contaminants which enter into the drilling mud compositions. The art has long recognized that all of these factors contribute to changes in the characteristics of the mud employed. For these reasons a considerable number of chemical compositions have been employed in order to impart to the drilling mud those properties which are desired and to maintain these properties throughout the drilling procedure.

Chief among the properties which are desirably maintained in the drilling muds are stability of both viscosity and gel strength. For this purpose the art has heretofore employed, for the most part, naturally occuring tannin compositions obtained from woody growths such as, for example, Quebracho extract. More recently lignin compounds obtained from waste wood pulping liquors and including numerous lignin sulfonates have been employed for this purpose. Even more recently, chemical compounds containing nitrogen have been employed as mud thinning agents and these compositions include urea, thiourea, dicyandiamide, and substituted ureas, dithioureas, guanylureas, and the like compositions. All of these addition agents contribute to low viscosity and gel strength of clay-water mud systems. They are further characterized by providing low water loss from the system and relatively plastic, non-cracking filter cakes.

The present invention is directed to the discovery that the water soluble carbohydrate mixture obtained from thermally hydrolyzed lignocellulose may be employed as an addition agent to drilling mud systems to impart thereto desirable low viscosities and gel strengths and to stabilize these characteristics over a considerable period of time extending through the entire drilling operation. One of the outstanding advantages of the present invention resides in the fact that the above described carbohydrate mixtures may be obtained cheaply and in unlimited quantities. They therefore afford economic advantages over the heretofore employed addition agents. Another advantage resides in the fact that the carbohydrates of the present invention are completely compatible with other chemical compositions which may be employed in the drilling mud system to impart thereto other desired characteristics such as, for example, sealing compositions such as various synthetic resins, cellulose derivatives, lignocellulose fibers, and the like materials.

The carbohydrate mixtures of the present invention may be obtained by thermal hydrolysis of lignocellulose at elevated temperatures and pressures and they comprise the water soluble material which may be extracted from such compositions. They may also be obtained by the ordinary acid hydrolysis of wood or woody materials as well as by saccharification of woody materials.

One of the outstanding methods of obtaining the water soluble oligosaccharide mixture of the present invention, particularly from the viewpoint of commercial availability of raw material, is that described in United States Patent No. 1,824,221 issued September 22, 1931 to William H. Mason. In that invention, chips or small pieces of wood of trees and woody materials of corn stalks, cane, and other vegetable growths are first charged into a closed chamber. Thereafter the chips are subjected to pressure of about 200–1200 p. s. i. and a temperature of about 200°–300° C. for approximately 30 minutes to 5 seconds respectively, in the presence of steam, and the material is then discharged from the chamber through a constricted discharge means therein into a zone of lower pressure (preferably atmospheric pressure), thereby exploding the wood chips into comparatively finely divided elongated fibers and bundles of fiber. Under this treatment the wood undergoes hydrolysis, and water-insoluble and readily hydrolyzable constituents thereof are rendered soluble or dispersible or suspendible in water. The water soluble portion ordinarily contains about 60–80% of pentosans and hexosans, 5–15% of non-sugar carbohydrates, 5–25% of lignin, and 2–8% of gums. Relatively concentrated aqueous solutions of these solubles are known in the trade as Masonex while the dried material is known as Masonoid.

It has been found that the addition of small amounts of the above described oligosaccharide mixture of clay-water mud systems imparts thereto desirably low viscosity and gel strength. Moreover, these properties are maintained for long periods of time and at relatively elevated temperatures and pressures which are normally encountered in the drilling operations. In employing the novel addition agents of the invention, amounts thereof within the range of from about 0.02% to about 0.5% based on the volume of mud, i. e. corresponding to about 0.07–1.75 pounds of addition agent per 42 gallon barrel of mud, have been found to give the best results. Amounts lower than about 0.02% do not ordinarily lower the mud viscosity or gel strength to the required degree. On the other hand, amounts of addition agent in excess of about 0.5% do not increase the viscosity reduction nor do they impart additional stability to the mud system. The oligosaccharide mixtures may be used as dry powder or they may be added in the form of relatively concentrated aqueous solutions. The mud, containing the above described quantities of addition agent, is preferably agitated for a period of time sufficient to insure an intimate contact of the agent and clay particles. The treated mud will retain its fluidity at elevated temperatures and pressures and in the presence of contaminants ordinarily encountered in drilling deep wells. The addition agents are also stable throughout the ordinary pH range encountered in oil well drilling, i. e. from about pH 6 to about pH 12 or more.

The invention will be further illustrated by the following examples:

EXAMPLE 1

Wyoming bentonite was slurried in water in the proportion of about 7.3 parts to 100 parts of distilled water. The slurry was stirred for 1.5 hours and then allowed to stand for 24 hours to reach equilibrium. Thereafter, 800 cc. samples were withdrawn and evaluated for viscosity and gel strength. In the following table, viscosity values were obtained with a Stormer viscosimeter.

Measurements are given in centipoises at 600 R. P. M. Gel strength was also evaluated with the same viscosimeter. The physical data was obtained according to the procedure described in the American Petroleum Institute Bulletin entitled "API–RP 29 (3rd edition)" with the exception that the tests were made immediately after addition of the Masonoid to the mud and also after an incubation period of 24 hours at 160° F.

*Table 1*

INITIAL RESULTS

| | | | | | |
|---|---|---|---|---|---|
| Percent Addition Agent by Volume | None | 0.02 | 0.04 | 0.1 | 0.2 |
| Lbs. Addition Agent per barrel mud | None | 0.07 | 0.14 | 0.35 | 0.7 |
| Viscosity, Centipoises @ 600 R. P. M. | 40 | 40 | 38 | 37 | 37 |
| Gel Strength, Initial, Gms | 14 | 16 | 16 | 14 | 14 |
| Gel Strength, 10 Min., Gms | 59 | 59 | 54 | 54 | 52 |

AFTER 24 HR. @ 160° F.

| | | | | | |
|---|---|---|---|---|---|
| Viscosity, Centipoises @ 600 R. P. M. | 54 | 47 | 45 | 43 | 40 |
| Gel Strength, Initial, Gms | 24 | 29 | 29 | 26 | 21 |
| Gel Strength, 10 Min., Gms | 74 | 62 | 61 | 59 | 54 |

EXAMPLE 2

The procedure of Example 1 was repeated with the exception that 25 parts of Masonoid were mixed with 6.25 parts of NaOH in order to provide a high initial pH in the mud system, i. e. pH 8.7–10.2.

*Table 2*

INITIAL RESULTS

| | | | | | |
|---|---|---|---|---|---|
| Percent Addition Agent by weight | None | 0.02 | 0.04 | 0.1 | 0.2 |
| Lbs. Addition Agent per barrel mud | None | 0.07 | 0.14 | 0.35 | 0.7 |
| Viscosity, Centipoises @ 600 R. P. M. | 40 | 39 | 38 | 44 | 56 |
| Gel Strength, Initial, Gms | 14 | 11 | 15 | 32 | 54 |
| Gel Strength, 10 Min., Gms | 59 | 64 | 74 | 86 | 102 |

AFTER 24 HR. @ 160° F.

| | | | | | |
|---|---|---|---|---|---|
| Viscosity, Centipoises @ 600 R. P. M. | 54 | 44 | 40 | 37 | 35 |
| Gel Strength, Initial, Gms | 24 | 14 | 13 | 10 | 8 |
| Gel Strength, 10 Min., Gms | 74 | 57 | 49 | 40 | 34 |

From the above tabulated physical data it will be seen that, even in the presence of NaOH, the oligosaccharide mixture of the present invention serves to reduce the viscosity and gel strength of bentonite-water mud systems. This is particularly true in the case of mud which has been aged for 24 hours at 160° F. which indicates that a mud system containing the addition agent of the present invention reaches equilibrium after a considerable aging period at elevated temperatures. From the viewpoint of practical use, this represents a decided advantage inasmuch as drilling muds are required to retain stability of viscosity and gel strength over a considerable period of time during the normal drilling operations.

I claim:

1. A drilling mud addition agent consisting of an oligosaccharide mixture obtained from thermally hydrolyzed wood and composed of arabinose, mannose, galactose, glucose, and xylose sugar units which consists principally of pentosans and hexosans containing from one to four combined sugar units.

2. A drilling mud composition characterized by improved viscosity and gel strength which comprises a major proportion of a normal bentonite-water mud system together with a minor proportion of a stabilizing agent consisting of an oligosaccharide mixture composed of arabinose, mannose, galactose, glucose, and xylose sugar units, said oligosaccharide mixture consisting of the water soluble portion of thermally hydrolyzed lignocellulose and consisting primarily of pentosans and hexosans.

3. A drilling mud composition characterized by improved viscosity and gel strength which comprises a normal bentonite-water mud system containing a minor proportion, within the range of from about 0.02% to about 0.5%, based on the volume of mud, of an oligosaccharide mixture composed of arabinose, mannose, galactose, glucose, and xylose sugar units, said oligosaccharide mixture consisting of the water soluble portion of thermally hydrolyzed lignocellulose and consisting primarily of pentosans and hexosans.

References Cited in the file of this patent

UNITED STATES PATENTS

| | | |
|---|---|---|
| 2,207,348 | Jones et al. | July 9, 1940 |
| 2,212,108 | Zacher | Aug. 20, 1940 |
| 2,337,296 | Kennedy et al. | Dec. 21, 1943 |
| 2,360,327 | Bailey et al. | Oct. 17, 1944 |
| 2,364,434 | Foster | Dec. 5, 1944 |
| 2,491,436 | Barnes | Dec. 13, 1949 |
| 2,518,439 | Fischer et al. | Aug. 15, 1950 |

OTHER REFERENCES

The pH of a Drilling Mud, Article in the Oil Weekly, Nov. 1, 1937, pages 30 and 34.

Rogers, Composition and Properties of Oil Well Drilling Fluids, pages 280, 281 and 282, 1st edition, published 1948 by Gulf Publishing Co., Houston, Texas.